US012583767B2

(12) United States Patent
Newell et al.

(10) Patent No.: US 12,583,767 B2
(45) Date of Patent: Mar. 24, 2026

(54) METHOD AND APPARATUS FOR REMOVAL OF PER- AND POLYFLUOROALKYL SUBSTANCES (PFAS) FROM GROUNDWATER

(71) Applicant: GSI Environmental Inc., Houston, TX (US)

(72) Inventors: Charles J. Newell, Houston, TX (US); David T. Adamson, Houston, TX (US); Poonam R. Kulkarni, Houston, TX (US); John A. Connor, Houston, TX (US)

(73) Assignee: GSI Environmental, Inc., Houston, TX (US)

( * ) Notice: Subject to any disclaimer, the term of this patent is extended or adjusted under 35 U.S.C. 154(b) by 235 days.

(21) Appl. No.: 17/111,771

(22) Filed: Dec. 4, 2020

(65) Prior Publication Data

US 2021/0214241 A1     Jul. 15, 2021

Related U.S. Application Data

(60) Provisional application No. 62/961,335, filed on Jan. 15, 2020.

(51) Int. Cl.
C02F 1/24 (2023.01)
C02F 1/28 (2023.01)
(Continued)

(52) U.S. Cl.
CPC ............... C02F 1/24 (2013.01); C02F 1/283 (2013.01); C02F 1/40 (2013.01); C02F 3/327 (2013.01);
(Continued)

(58) Field of Classification Search
CPC .... B09C 1/002; C02F 3/327; C02F 2101/301; C02F 2101/36; C02F 2103/06;
(Continued)

(56) References Cited

U.S. PATENT DOCUMENTS 4,489,779 A    12/1984 Dickinson et al.
5,277,518 A    1/1994 Billings et al.
(Continued)

FOREIGN PATENT DOCUMENTS

CN        110255638 A  *  9/2019  ................ C02F 1/00
WO        2019111238      6/2019
WO     WO-2019111238 A1 *  6/2019  ............. B03D 1/028

OTHER PUBLICATIONS

"Water table". Encyclopædia Britannica. Encyclopædia Britannica Online. Encyclopædia Britannica Inc., 2015. Web. Jun. 17, 2015 <http://www.britannica.com/science/water-table>. (Year: 2015).*
(Continued)

*Primary Examiner* — In Suk C Bullock
*Assistant Examiner* — Bernadette Karen McGann
(74) *Attorney, Agent, or Firm* — The Petruzzi Law Firm; James D. Petruzzi

(57) ABSTRACT

A decontamination method for subsurface aquifers having per- and polyfluoroalkyl substances (PFAS) contaminants by injecting gas through a screened well or open tube through a porous media to form buoyant material where the PFAS contaminants accumulate on and/or in the buoyant material and rise to the water table or top of the aquifer with PFAS that desorbs from the buoyant material and concentrates in the shallow groundwater, and extracting or sequestering the groundwater near the water table or top of the confined aquifer and/or collecting the buoyant material for treatment. The method may include treatment of aquifer material consisting of gravel, sand, silt, clay, or fractured geologic
(Continued)

media, or combination, and extraction through phytoremediation, groundwater extraction wells, wellpoint systems, or groundwater extraction trenches and include a seal and/or check valve near the water table in the trench to selectively permit water and buoyant material to flow upward.

26 Claims, 13 Drawing Sheets

(51) Int. Cl.

| | | |
|---|---|---|
| C02F 1/40 | (2023.01) | |
| C02F 3/32 | (2023.01) | |
| C02F 101/30 | (2006.01) | |
| C02F 101/36 | (2006.01) | |
| C02F 103/06 | (2006.01) | |

(52) U.S. Cl.
CPC .... *C02F 2101/301* (2013.01); *C02F 2101/36* (2013.01); *C02F 2103/06* (2013.01); *C02F 2201/005* (2013.01); *C02F 2303/18* (2013.01)

(58) Field of Classification Search
CPC .. C02F 2201/005; C02F 2303/18; C02F 1/24; C02F 1/283; C02F 1/40
See application file for complete search history.

(56) References Cited

U.S. PATENT DOCUMENTS

| | | | |
|---|---|---|---|
| 5,389,267 | A | 2/1995 | Gorelick et al. |
| 5,611,671 | A | 3/1997 | Tripp, Jr. |
| 6,210,955 | B1 * | 4/2001 | Hayes ...................... B09C 1/10 |
| | | | 516/18 |
| 9,999,909 | B2 | 6/2018 | Council, III |
| 10,259,730 | B2 | 4/2019 | Ball et al. |
| 10,752,521 | B2 | 8/2020 | Nelson |
| 2003/0210956 | A1 | 11/2003 | Tanaka et al. |
| 2006/0131244 | A1 | 6/2006 | McGrade |
| 2008/0175671 | A1 * | 7/2008 | Bowman ................ B09C 1/002 |
| | | | 405/128.5 |
| 2008/0230485 | A1 | 9/2008 | Shechter et al. |
| 2015/0041392 | A1 | 2/2015 | Hu et al. |
| 2019/0263679 | A1 | 8/2019 | Phillips et al. |
| 2019/0300387 | A1 | 10/2019 | Nelson |
| 2021/0171365 | A1 * | 6/2021 | Nelson .................. B03D 1/008 |

OTHER PUBLICATIONS

Machine generated translation of CN 110255638 A (Year: 2019).*
Allmon et al., Groundwater circulating well technology assessment, No. NRL/PU/6115--99-384. Naval Research Lab Washington DC, 1999.
Ross et al., "A review of emerging technologies for remediation of PFASs." Remediation Journal 28, No. 2 (2018): 101-126.

* cited by examiner

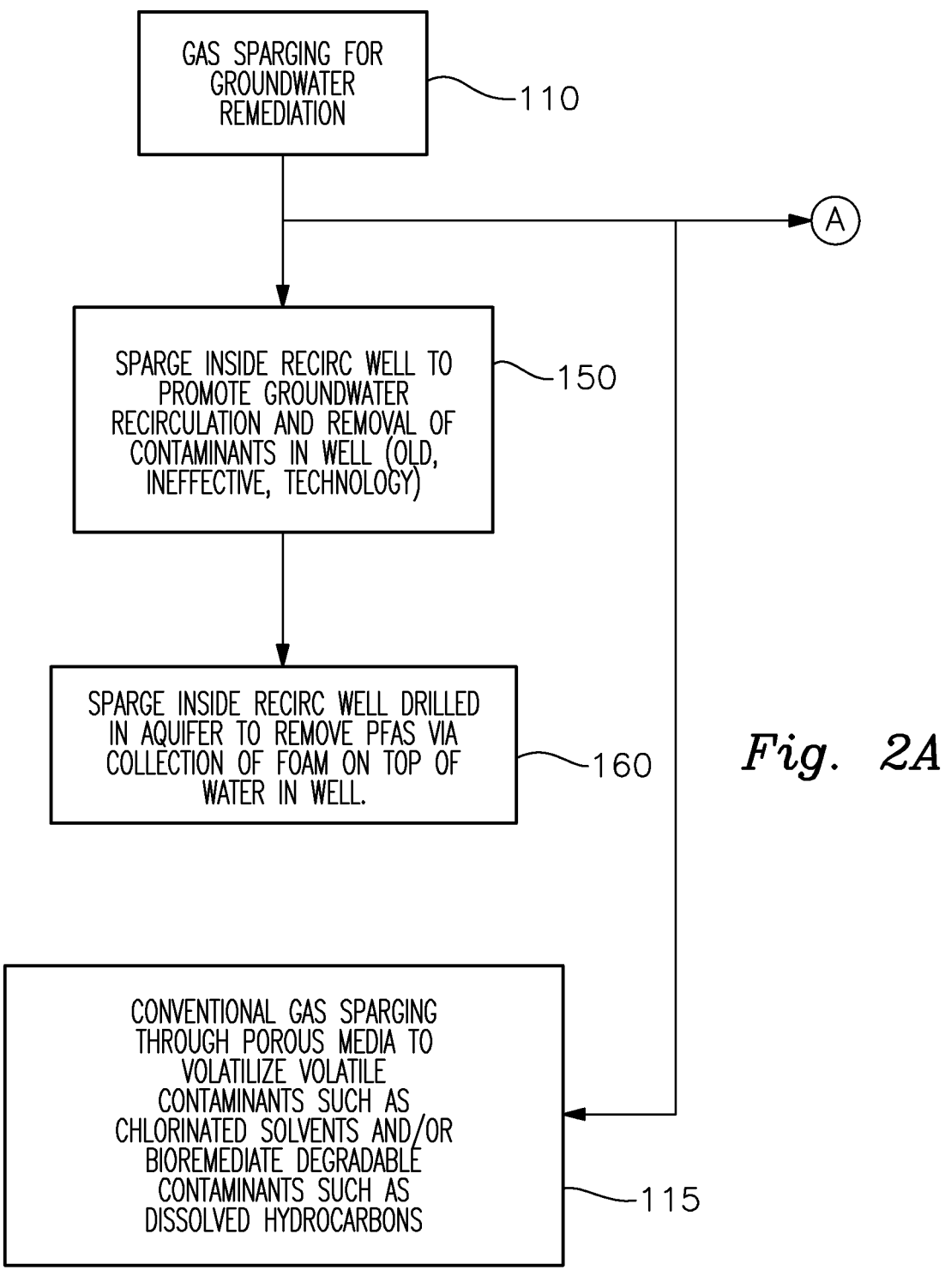
PRIOR ART

METHOD AND APPARATUS FOR REMOVAL OF PER- AND POLYFLUOROALKYL SUBSTANCES (PFAS) FROM GROUNDWATER

CROSS REFERENCE TO RELATED APPLICATIONS

This application claims the benefit of U.S. Provisional Patent Application Ser. No. 62/961,335 filed on Jan. 15, 2020 entitled "Method and Apparatus for Removal or Concentration of Per- and Polyfluoroalkyl Substances (PFAS) from Groundwater" which is incorporated herein by reference.

STATEMENT REGARDING FEDERALLY SPONSORED RESEARCH FOR DEVELOPMENT

Not Applicable

FIELD OF THE INVENTION

This invention relates to groundwater remediation systems, and more particularly, to a method and apparatus for Removal of Per- and Polyfluoroalkyl Substances (PFAS) from Groundwater.

BACKGROUND OF THE INVENTION

Per- and Polyfluoroalkyl Substances (PFAS) are a family of more than 3000 manmade fluorinated chemicals with unique physical and chemical properties that have led to their wide use by consumers and industry since the mid-1950s. PFAS have been used in firefighting foams, as coating for textiles, paperware, and cookware and numerous other applications and this use has resulted in their presence in the environment.

The scientific community is now recognizing that some of these compounds can pose concerns with regard to human health and the environment if present at high enough concentrations. In addition, some PFAS, such as perfluorooctanoate (PFOA) and perfluorooctane sulfonate (PFOS), are considered relatively mobile and persistent and are not presently known to degrade in the environment, including groundwater. These factors have led some to speculate that sources of PFAS to groundwater may result in contaminated groundwater plumes that are similar or larger than plumes generated by releases of other well-known groundwater contaminants such as gasoline constituents and chlorinated solvents.

Three factors make complete in-situ remediation of PFAS source zones and plumes exceptionally costly and potentially impracticable at many sites. First, the chemical properties that make PFAS mobile and persistent in groundwater make many commonly used in-situ remediation technologies ineffective, such as bioremediation, many forms of chemical oxidation, chemical reduction, and thermal treatment. Second, PFAS are a family of compounds with varied chemical properties, such that multiple technologies/treatment trains may be required to improve treatment efficiency. For example, some PFAS sorb readily to adsorptive media used to remove contaminants from water, but others are much less sorptive. Third, based on current toxicological studies with safety factors, the U.S. Environmental Protection Agency (USEPA) published a Draft Interim Recommendation for public comment with federal preliminary remediation goals of 70 part per trillion (ppt) for PFOA+PFOS combined (USEPA, 2019). This is about 70 times lower (more stringent) than the 5000 ppt cleanup standards for common groundwater contaminants such as benzene and trichloroethene. However, partly in response to uncertainty in PFAS toxicity studies, several states have proposed even lower part per trillion (ppt) drinking water standards and groundwater cleanup goals (Simon, J A, Abrams, S, Bradburne, T, et al. PFAS Experts Symposium: Statements on regulatory policy, chemistry and analytics, toxicology, transport/fate, and remediation for per—and polyfluoroalkyl substances (PFAS) contamination issues. Remediation. 2019; 29: 31-48).

Current groundwater remediation technologies that destroy contaminants in-situ are not effective for PFAS source zones or plumes. For example, bioremediation cannot be employed because, while some PFAS can partially biodegrade, they do not completely biodegrade. Thermal treatment is ineffective because these compounds are much less volatile than conventional groundwater contaminants and cannot be destroyed at the range of temperatures induced by in-situ thermal treatment. Among chemical oxidants that are commonly used during in situ treatment, only persulfate has been shown to be strong enough to break the carbon-fluorine bonds in PFAS, but research studies are mixed on the degree of destruction that can be achieved (Houtz, E. F., and D. L. Sedlak. 2012. Oxidative conversion as a means of detecting precursors to perfluoroalkyl acids in urban runoff. Environmental Science and Technology 46: 9342-9349; McKenzie, E. R., Siegrist, R. L., McCray, J. E., & Higgins, C. P., 2015. Effects of chemical oxidants on perfluoroalkyl acid transport in one-dimensional porous media columns. Environmental Science & Technology, 49(3), 1681-1689; McKenzie, E. R., Siegrist, R. L., McCray, J. E., & Higgins, C. P., 2015. The influence of a non-aqueous phase liquid (NAPL) and chemical oxidant application on perfluoroalkyl acid (PFAA) fate and transport. Water Research 92: 199-207). Overall, PFAS have unique chemical properties that require new remediation technologies or innovative applications/combinations of existing remediation technologies (ITRC, 2018. Fact Sheet: Remediation Technologies and Methods for Per- and Polyfluoroalkyl Substances (PFAS). Interstate Technology Regulatory Council. 2018). One key property is that, because PFAS are surfactants, they will partition from the aqueous (dissolved) phase to air/water interfaces.

An emerging in-situ PFAS remediation technology proposed by both Phillips et al. "Method and Apparatus for Separation of A Substance from Groundwater", (WO 2017/210752); and Nelson "System and Method for Treatment of Soil and Groundwater Contaminated with PFAS" (U.S. Pat. No. 10,752,521) relies on gas sparging within a groundwater well to create a PFAS foam and to induce circulation within groundwater wells, which then, in theory, will circulate groundwater vertically outside the well to treat the plume (e.g., groundwater circulation well technology, or GCW) and create a PFAS foam within the well that migrates to the water surface within the well and is subsequently removed. The patent also describes methods to remove the foam from the surface of the water in the well. However, the present invention is predicated on gas sparging within a porous media (such as the aquifer material or a man-made trench), not within the small volume of water within a well installed in an aquifer.

Groundwater circulation well (GCW) technology was tested extensively in the 1990s and was generally found to be unsuccessful as a groundwater remediation method. A technology review by the U.S. Navy in 1999 first observed this. (Allmon, W. E., Everett, L. G., Lightner, A. T., Alleman, B., Boyd, T., and Spargo, B. J. (1999), "Groundwater circulation well technology assessment", (NRL/PU/6115-99-384), Washington, DC: Naval Research Laboratory):

"As of this writing, GCWs have been tested and/or operated at over 50 contaminated private and public sites in the U.S., with mixed results. Few sites have been clear successes and just as many seem to have been clear failures, the preponderance, however, are blurred into the middle, attaining some contaminant reduction but lacking the data to allow for validation of the technology's efficacy. The wide-scale use of GCW seems limited by a general uncertainty and skepticism about the technology's true performance. In the absence of well documented examples of successful demonstrations, the use of GCW technology will likely continue to be limited, at least on federal sites."

Because of these limitations, cleanup processes that rely on subsurface groundwater recirculation will likely have limited usefulness for widespread PFAS groundwater cleanup problems. (Ross, I, McDonough, J, Miles, J, et al. A review of emerging technologies for remediation of PFASs. Remediation. 2018; 28: 101-126) concurred, referencing Allmon et al., (Allmon, W. E., Everett, L. G., Lightner, A. T., Alleman, B., Boyd, T., & Spargo, B. J. (1999). Groundwater circulation well technology assessment. (NRL/PU/6115-99-384). Washington, DC: Naval Research Laboratory) and concluding that "A review of the groundwater in-well circulation technologies described how they have limited application in groundwater remediation as a result of problems with short-circuiting and smaller than expected ROI" (Allmon et al., 1999).

Ross et al., (2018) noted that sparging outside the well annulus has not been successfully accomplished: "Thus far, this technology has not given consideration to achieving an ROI outside of the well annulus for either injecting air or collecting the foam concentrate." (ROI: Radius of Influence)

The lack of effective in-situ remediation technologies means that most PFAS plumes that require remediation are managed using inefficient groundwater pump-and-treat systems (FIG. 1), where large volumes of low concentration groundwater are extracted over decades to remove contaminant mass and prevent further plume migration. One in-situ stabilization technology, the injection of colloidal granular activated carbon (GAC), has shown some ability to reduce the mass flux of PFAS plumes, but may not be a permanent solution if the GAC becomes saturated with PFAS or non-PFAS constituents moving through groundwater.

In summary, there are currently no cost-effective in-situ treatment technologies for PFAS, making PFAS cleanup sites more difficult and expensive to manage than many other groundwater contamination sites.

BRIEF SUMMARY OF THE INVENTION

A process is disclosed for the in-situ concentration of PFAS in groundwater to: 1) reduce the volume of contaminated plume; 2) reduce the amount of extracted groundwater that needs to be treated; and 3) to facilitate the removal of PFAS from the subsurface. The process relies on the in-situ sparging of a gas such as air or nitrogen within and/or under the PFAS plume in groundwater or injection of a liquid fluid in such a way that a chemical or biological reaction results in gaseous bubble formation in the aquifer.

Because the chemical structure of PFAS is similar to a surfactant, the PFAS will partition and collect on air/water interfaces (e.g., bubbles or air channels). When a sparge gas is introduced in a groundwater treatment zone, PFAS will collect at the air/groundwater interfaces and be drawn upwards by the buoyancy of the sparged gas. The sparging results in lower PFAS concentrations in the deeper portions of the sparged zone, remediating this portion of the aquifer. The sparging will also create higher PFAS concentrations and a PFAS buoyant material comprised of a mixture of air, water, and PFAS that is less dense than water and therefore buoyant in the subsurface that migrates to near the top of the aquifer, sometimes through channels formed by the buoyant material and/or through pressure. This migration makes it easier to remove the PFAS by skimming the low volume of groundwater containing higher concentrations of PFAS and/or by direct removal of the buoyant material. Even in the absence of removal, the sparging can also concentrate and displace the PFAS away from groundwater flow or extraction zones, thereby serving to sequester the PFAS in unused or less-used portions of the aquifer or into more stagnant portions of the aquifer. Concentration of the PFAS can also reduce the volume of aquifer that needs to be treated using in-situ technologies.

The primary advantage of the invention is to provide a system for concentration, displacement, sequestering, and/or removal of high PFAS concentration groundwater and buoyant material that has been concentrated by the sparging.

Another advantage of the invention is to provide a system to sequester PFAS without the necessity of extracting groundwater.

Yet another advantage of the invention is to provide a removal through a permeable trench or above ground trench of a high PFAS concentration groundwater layer that has been concentrated by the sparging and collection.

Yet another advantage of the invention is to provide a removal by phytoremediation of a high PFAS concentration groundwater layer that has been concentrated by the sparging and collection.

In accordance with a preferred embodiment of the invention, there is shown a method for the decontamination of a subsurface aquifer containing one or more PFAS contaminants, having the steps of injecting gas through a screened well or open tube and into the aquifer through a natural aquifer material so as to form a buoyant material in the aquifer, the one or more PFAS contaminants accumulating in the buoyant material, allowing the buoyant material to rise to the water table or the top of a confined aquifer where some of the PFAS will desorb from the buoyant material, concentrating the PFAS in the shallow groundwater, and extracting the groundwater near the water table or top of the confined aquifer that contains the concentrated PFAS.

In accordance with another preferred embodiment of the invention, there is shown a method for the decontamination of a subsurface aquifer containing one or more PFAS contaminants, having the steps of injecting gas into the aquifer through a natural aquifer material so as to form a buoyant material in the aquifer, the one or more PFAS contaminants accumulating on the buoyant material, allowing the buoyant material to rise to the water table or the top of a confined aquifer where some of the PFAS will desorb, concentrating the PFAS in the shallow groundwater, and extracting the groundwater near the water table or top of the confined aquifer that contains the concentrated PFAS.

In accordance with another preferred embodiment of the invention, there is shown a method for the decontamination of a subsurface aquifer containing one or more PFAS contaminants, having the steps of Injecting gas through a screened well or open tube into an emplaced porous material in the aquifer so as to form a buoyant material in the trench, the one or more PFAS contaminants accumulating on the buoyant material, and allowing the buoyant material to rise to the top of the emplaced porous material where some of the PFAS will desorb from the buoyant material, thereby concentrating the PFAS in the shallow groundwater in the emplaced porous material.

In accordance with another preferred embodiment of the invention, there is shown a method for the decontamination of a subsurface aquifer containing one or more PFAS contaminants, having the steps of, injecting gas into the aquifer through a natural aquifer material so as to form a buoyant material in the aquifer, the one or more PFAS contaminants accumulating on the buoyant material, allowing the buoyant material to rise to the water table or the top of a confined aquifer where some of the PFAS will desorb from the buoyant material, concentrating the PFAS in the shallow groundwater, and whereby the PFAS remains sequestered in the mix of air and groundwater near the top of the water table or top of the confined aquifer.

In accordance with another preferred embodiment of the invention, there is shown a method for the decontamination of a subsurface aquifer containing one or more PFAS contaminants, having the steps of injecting gas into the aquifer through a natural aquifer material so as to form a buoyant material in the aquifer, the one or more PFAS contaminants accumulating on the buoyant material, allowing the buoyant material to rise to the water table or the top of a confined aquifer where some of the PFAS will desorb from the buoyant material, concentrating the PFAS in the shallow groundwater, and thereby reducing the treatment volume required for in-situ remediation.

Other objects and advantages of the present invention will become apparent from the following descriptions, taken in connection with the accompanying drawings, wherein, by way of illustration and example, an embodiment of the present invention is disclosed.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

FIGS. 2A, 2B, and 2C illustrates a PFAS Plume flow chart of various preferred embodiments of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for later filed claims and as a representative basis for teaching one skilled in the art to employ the present invention in virtually any appropriately detailed system, structure, method or manner.

A process of a preferred embodiment is disclosed for the in-situ concentration of PFAS in groundwater to: 1) reduce the volume of contaminated plume; and/or 2) reduce the amount of contaminated groundwater that needs to be treated; 3) sequester PFAS in the subsurface for long periods to preclude their migration to receptors; and/or 4) facilitate the removal of PFAS from the subsurface. The process relies on the in-situ sparging of a gas such as air or nitrogen into a natural or man-made porous media (e.g., sand or gravel) within a PFAS contaminated groundwater. Because the chemical structure of most of the environmentally important PFAS is similar to a surfactant, the PFAS will partition and collect on air/water interfaces. A similar air/water partitioning process occurs when gas bubbles or gas channels comprised of carbon dioxide and methane are produced by naturally occurring bacteria at fuel release sites. A thin film of undissolved fuel will collect at the air/water interface, similar to a thin oil sheen around the gas bubble/channel (ITRC, 2018. Light Non-Aqueous Phase Liquids (LNAPL) Site Management: LCSM Evolution, Decision Process, and Remedial Technologies, Appendix E). When a sparged gas is introduced directly in a groundwater containing PFAS, the PFAS will collect on the air/groundwater interfaces and be drawn upwards by the buoyancy of the buoyant material. The sparging results in lower concentrations in the deeper sparged zone, thereby improving groundwater quality. The sparging will also create higher PFAS dissolved concentrations in the water and a PFAS containing buoyant material near the top of the aquifer, making it easier to remove the PFAS by skimming the low volume of high concentration groundwater and/or by direct removal of the buoyant material. Even in the absence of removal, the now-concentrated PFAS will be sequestered in the shallower groundwater zone, potentially displacing these contaminants from a deeper more productive and/or higher flow groundwater zone.

Figure 1:
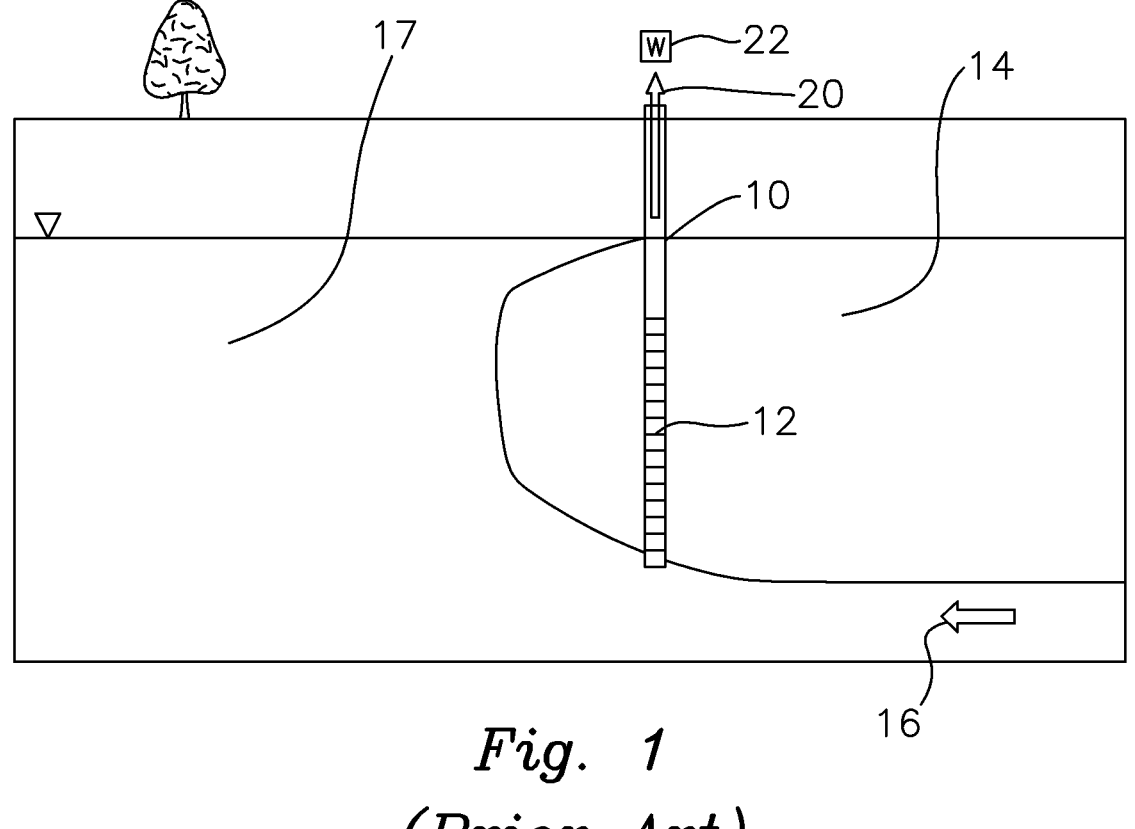
FIG. 1 illustrates a PFAS Plume being controlled by a conventional pump and treat system using the prior art.

FIG. 1 shows a PFAS plume 14 moving in the direction of groundwater flow 16 in an aquifer 17 with water table 10. A pump and treat system recovery well 12 extracts a relatively high volume, low concentration PFAS concentration water 20 and sends this water to a water treatment system 22 at the surface.

Figure 2B:
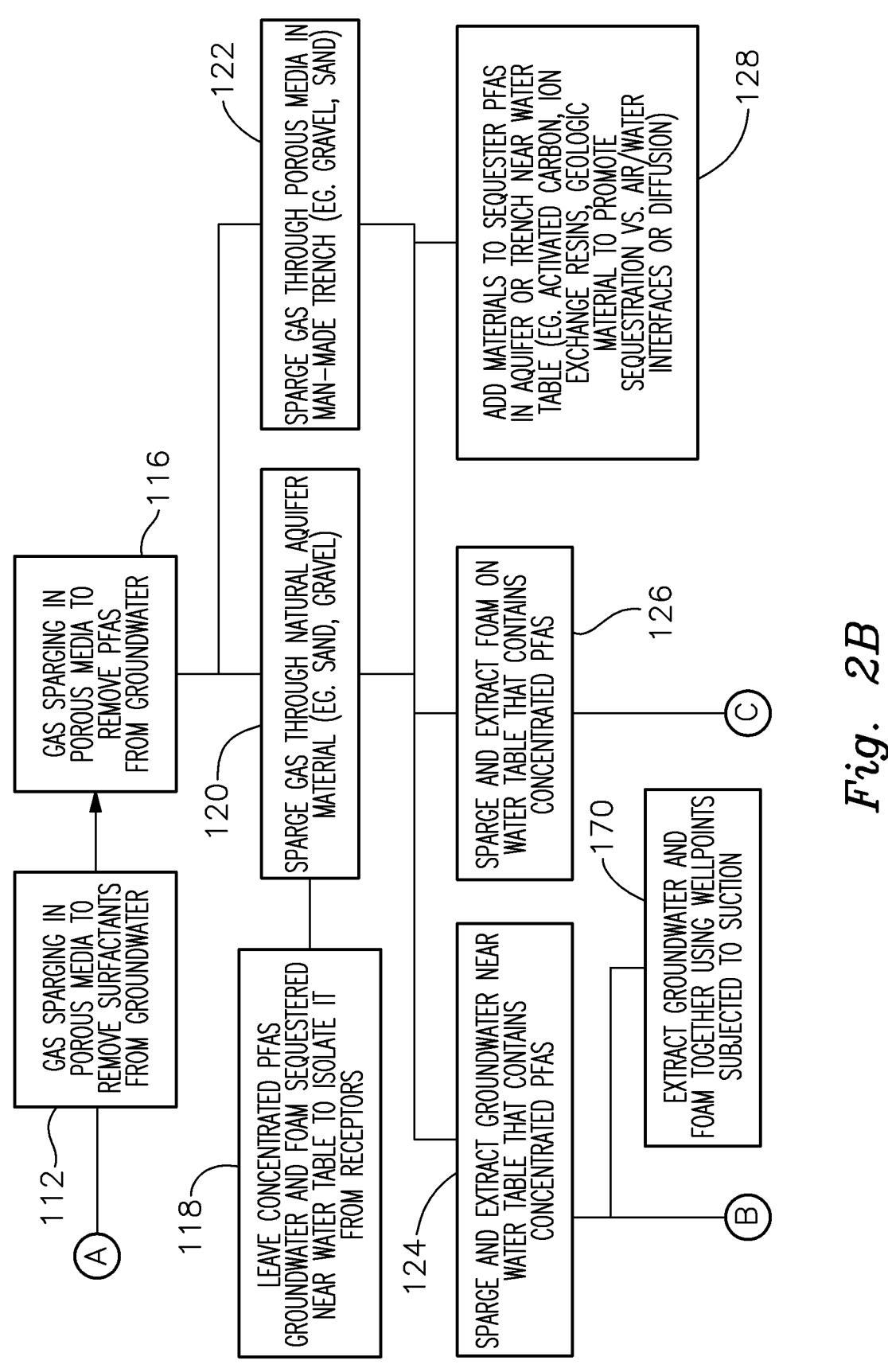
Figure 2C:
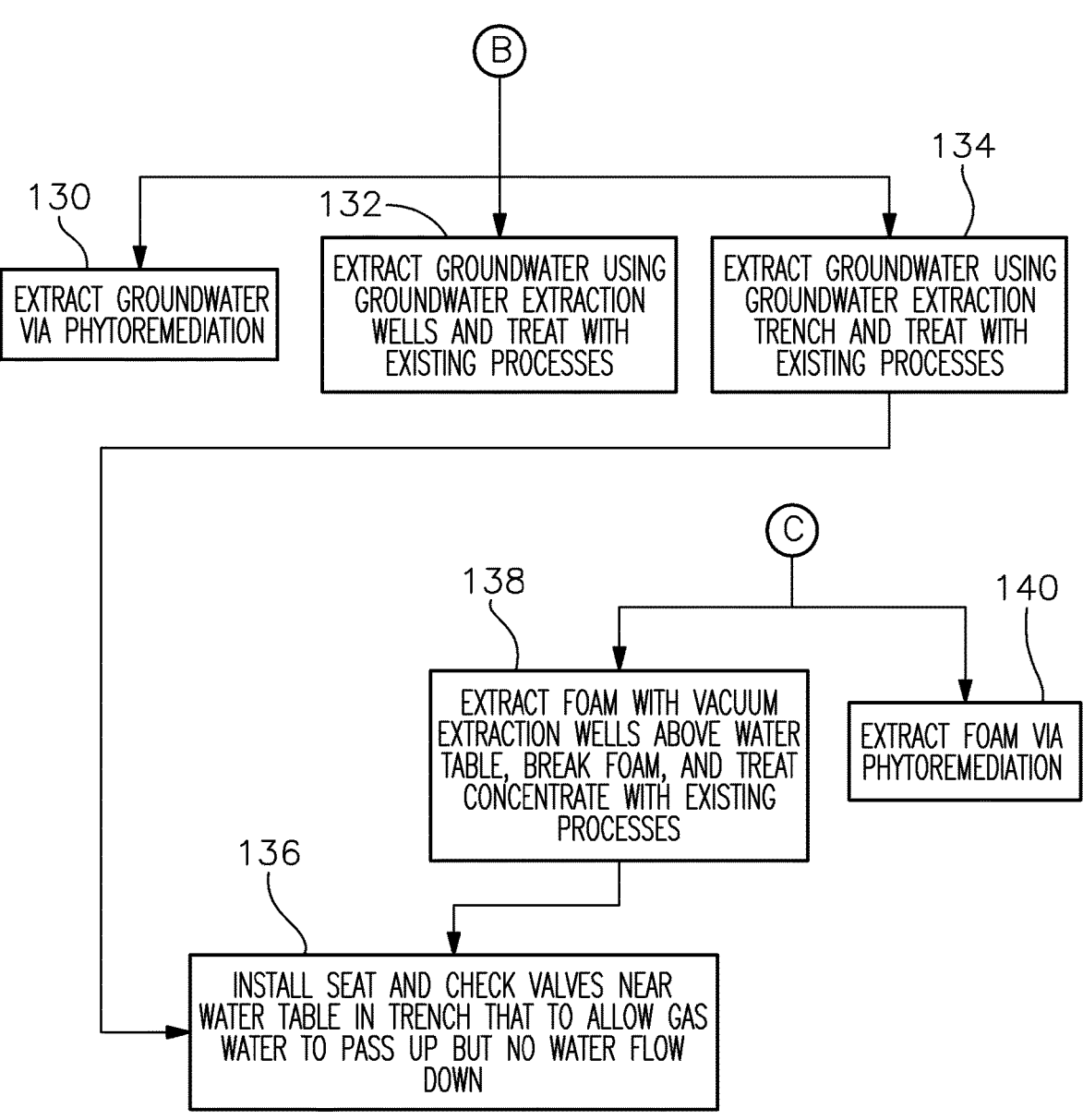

FIGS. 2A, 2B and 2C provide conceptual outline and flow chart of the preferred embodiments of the invention. At 110, gas sparging for groundwater remediation can take several forms. At 150, prior art sparging inside a recirculation well is well known but has proven relatively ineffective for most groundwater contaminants. At 160, sparging inside a recirculation well drilled in an aquifer via collection of foam on top of the water in a well has already been proposed in several prior art solutions such as WO2017/210752 to Phillips et al. and U.S. Pat. No. 10,752,521 to Nelson. Similarly, conventional gas sparging at 115 through porous media to volatilize contaminants such as chlorinated solvents and/or bioremediate degradable contaminants such as dissolved hydrocarbons is likewise well known.

According to a preferred embodiment of the invention, a well is drilled in the aquifer and pressured gas (most commonly air) is directed down the well and out a well screen near the bottom of the well. This can be a vertical, horizontal, or angled well. Due to pressure of injection and the buoyancy of the gas, the gas migrates both outwards and upwards from the well screen, sometimes in the form of bubbles but also in the form of gas channels. Pulsed sparging where the sparging is cycled on and off over the span of a few hours is known to increase the contact efficiency of the bubbles/channels with the water.

According to preferred embodiments of the invention, at 112 in FIG. 2B, gas sparging in porous media to remove surfactants like PFAS from groundwater has not been employed and has significant benefits. In the first group of embodiments at 116, gas sparging in porous media is used to remove PFAS from groundwater. In one embodiment (schematically depicted in FIGS. 5 and 6) at 120, one could sparge gas through natural aquifer material such as sand or gravel. In an alternative embodiment (schematically depicted in FIG. 7) at 118, one can leave concentrated PFAS groundwater and buoyant material sequestered near the water table or surface of the groundwater unit to isolate it from receptors. As an addition or alternative to embodiments (schematically shown in FIG. 5 or 6) at 124 sparging is performed to concentrate PFAS in groundwater near the water table and then this concentrated water is extracted using groundwater pumping or other methods. Similarly, at 126 sparging to create a buoyant material on the surface of the groundwater unit is performed and the buoyant material is then removed by known methods such as using shallow wells above the water table that are subjected to suction.

Embodiments (schematically shown in FIGS. 9 and 10) at 122 involves sparging gas through emplaced porous media in man-made trenches using gravel or sand or other materials. Under its natural horizontal flow gradient, groundwater will flow through one side of the trench and back out the opposite side. The sparging in the trench serves to concentrate PFAS at the surface of the water, thereby facilitating the removal or treatment of the now-concentrated, lower-volume of contaminated groundwater or buoyant material. As discussed above, alternatives 124 or 126 may be employed to extract PFAS or alternative 128 may be employed to sequester PFAS where materials in the aquifer or trench near the water table using activated carbon, ion exchange resins, zeolites, geologic material, or gases.

Figure 5:
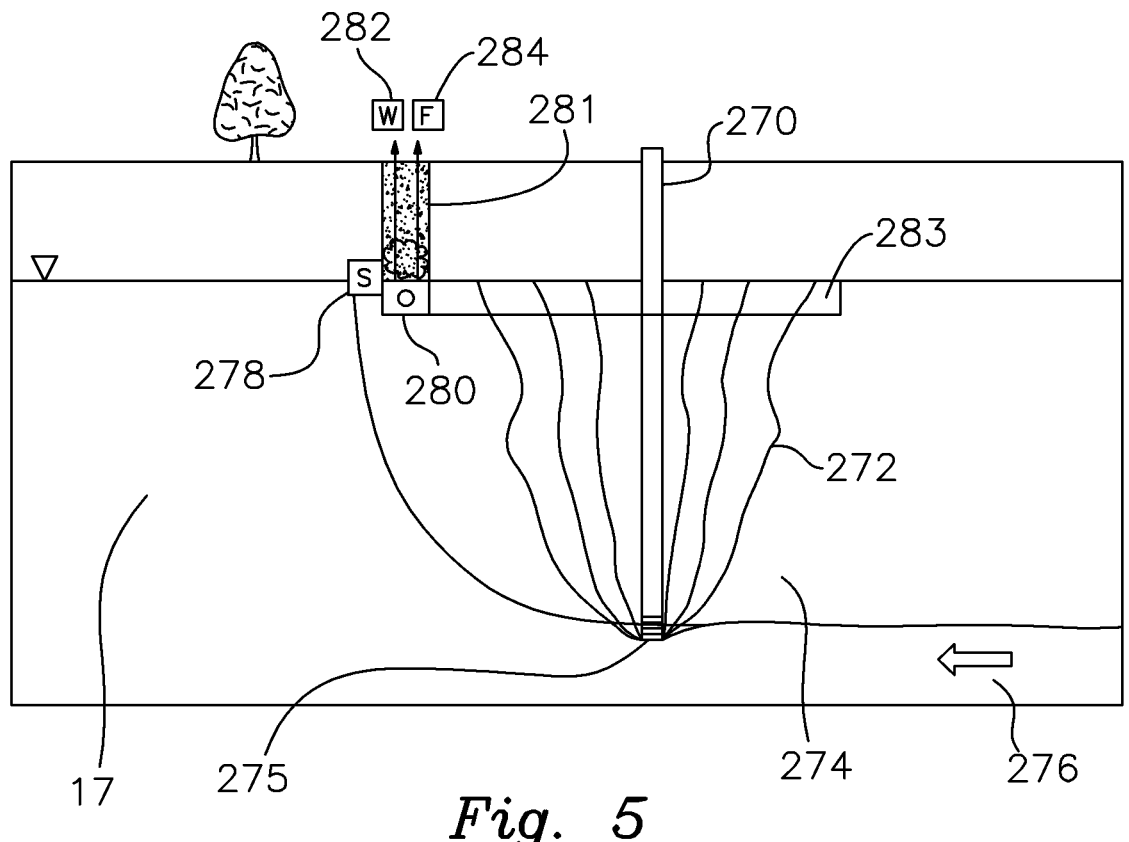
FIG. 5 illustrates a PFAS Plume according to a preferred embodiment of the invention being treated using a shallow trench according to a preferred embodiment of the invention.
Figure 6:
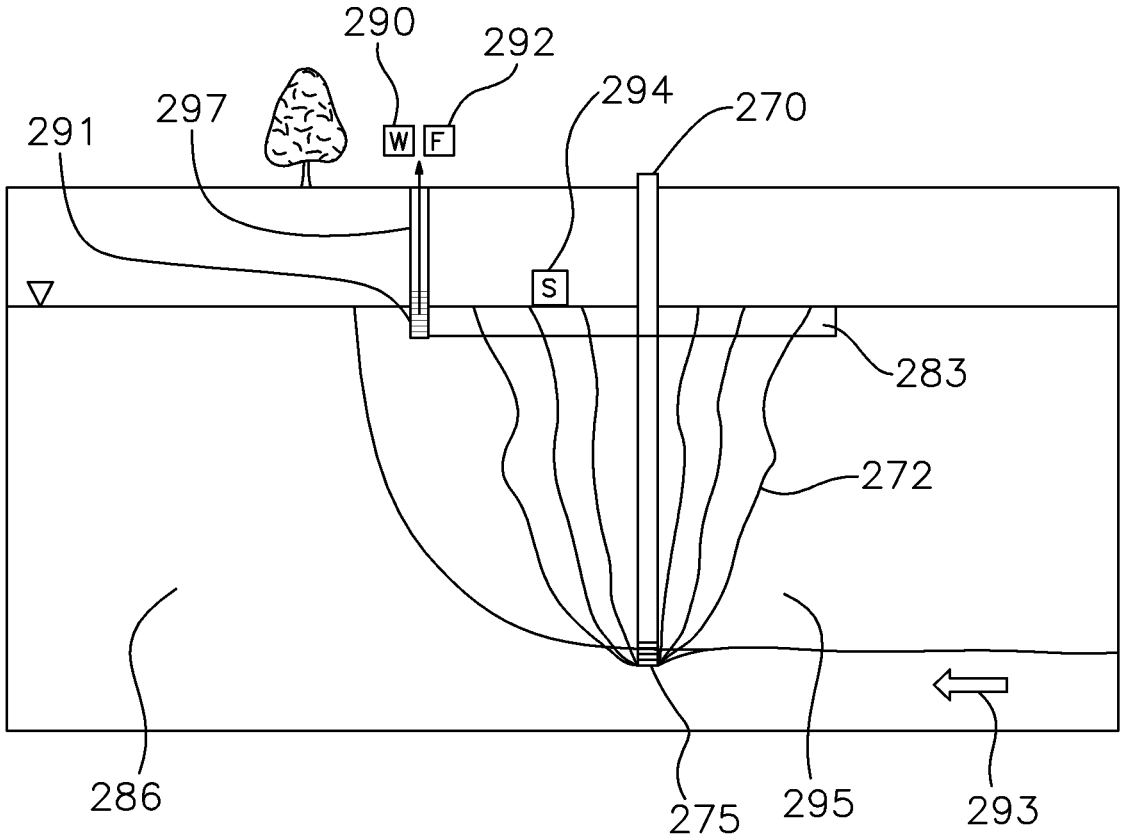
FIG. 6 illustrates PFAS Plume according to a preferred embodiment of the invention being treated using extraction wells according to a preferred embodiment of the invention.

Another embodiment (schematically shown in FIG. 8) at 130 in FIG. 2C involves extractions of the shallow groundwater via phytoremediation. As an addition to embodiment at 132 one could extract the groundwater using groundwater extraction wells and treating with existing processes (FIG. 6). Similarly, at 134, one could extract the groundwater using a groundwater extraction trench and treatment with existing processes with embodiments (FIG. 5 or FIG. 9). In embodiment (FIG. 10), at 136, one could install a seal (such as an impermeable plastic layer) perforated with check valves near the water table in the trench that allow gas, water, and buoyant material that is mobilized during the sparging process to pass up above the seal for treatment/removal but prevents this mobilized gas, water and buoyant material from flowing back down, therefore helping concentrate the PFAS above the seal. In some embodiments, PFAS could be concentrated in a smaller volume of GW so as to optimize application of in-situ or below-ground treatment technologies, should such technologies be developed.

In embodiments shown in FIG. 5, 6, 9 or 10, one could at 138 extract concentrated groundwater with PFAS or buoyant material with vacuum extraction wells above the water table and treat the concentrate with existing processes. And at 140 with embodiment 3, one could use phytoremediation where plants or trees planted above the concentrated PFAS zone remove from the groundwater and concentrate it in the plant material. The plants/trees could then be harvested at certain intervals and then incinerated or sent to a landfill to remove the PFAS from the environment.

Figure 11:
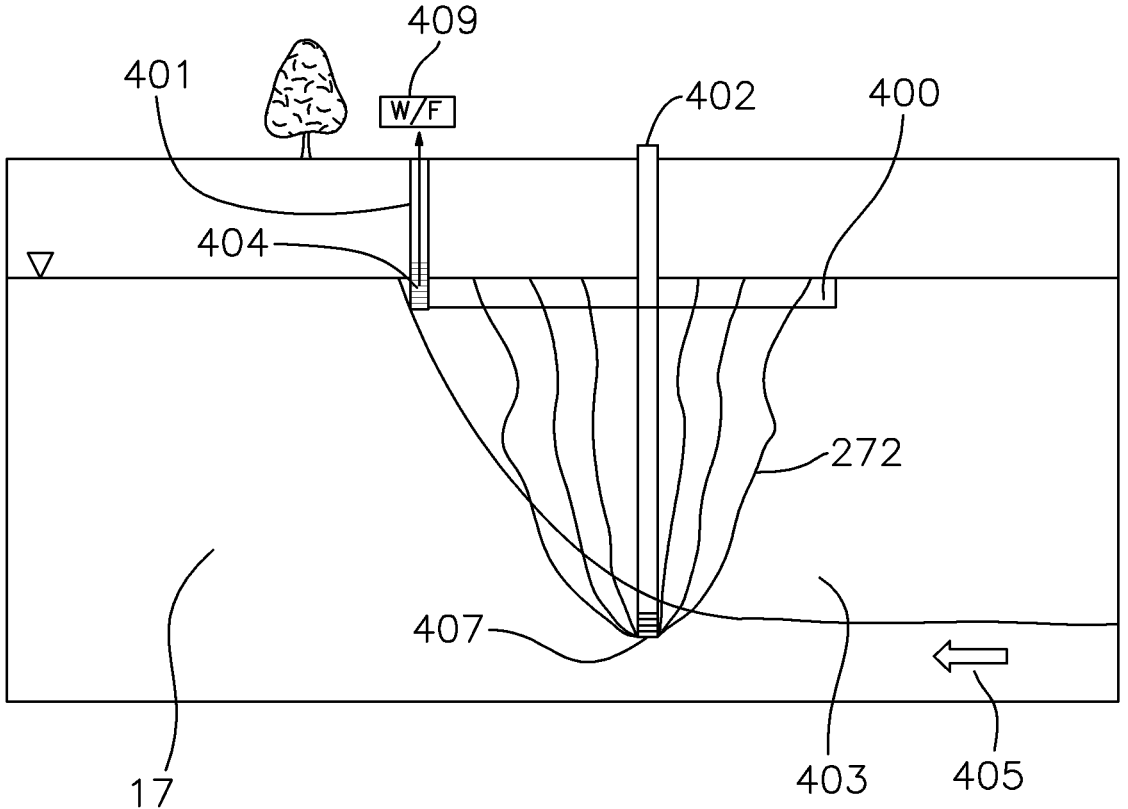
FIG. 11 illustrates a PFAS Plume according to a preferred embodiment of the invention being treated using collection above ground using a wellpoint system according to a preferred embodiment of the invention.

At 170 in FIG. 2B one could use a wellpoint system comprised of small individual wells connected to a manifold and then a vacuum pump (FIG. 11). The suction from the vacuum pump would then extract a combination of air, PFAS containing water, and buoyant material.

Figure 3:
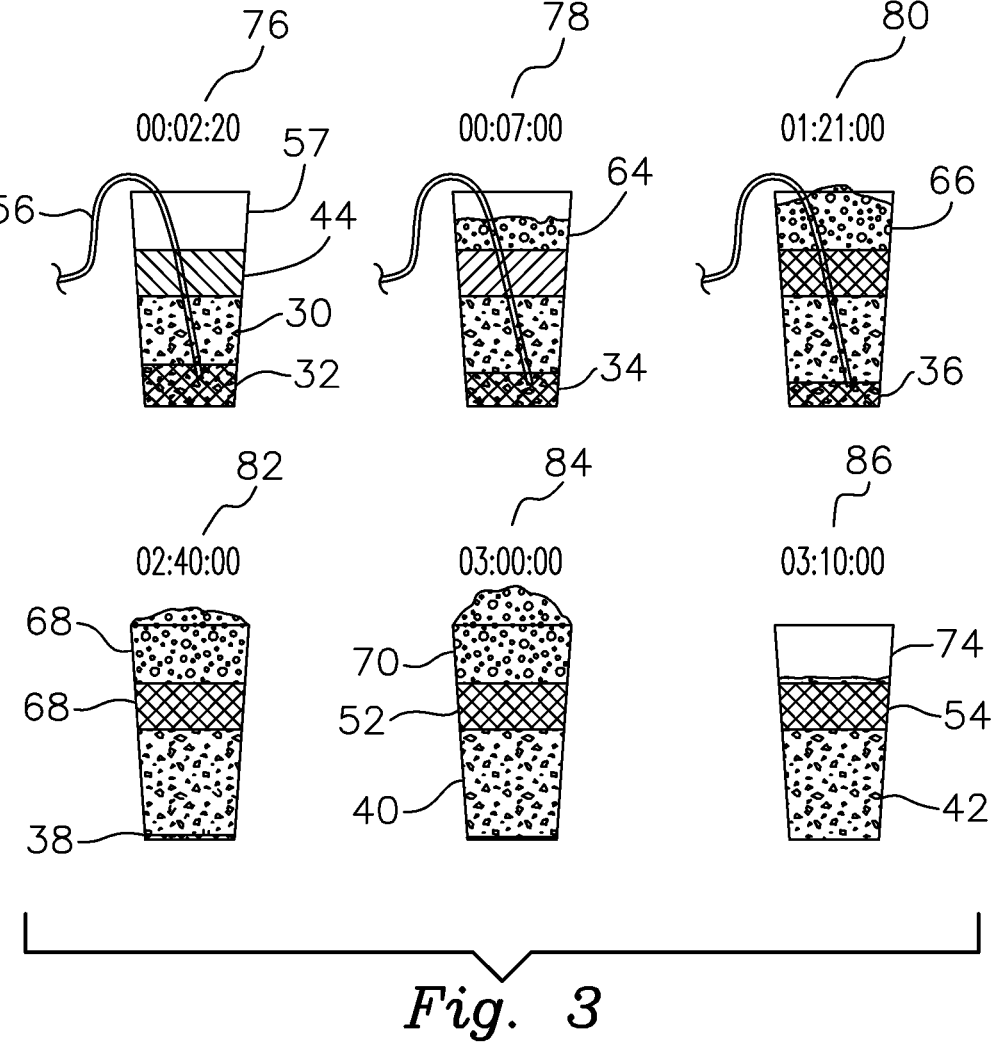
FIG. 3 is a demonstration graphic of a small-scale sparging experiment showing the principles according to a preferred embodiment of the invention.

A proof-of-concept laboratory experiment was performed to visually and quantitatively show the removal of a surfactant from an artificial groundwater system (FIG. 3 and FIG. 4). PFAS chemicals are difficult and expensive to analyze; however, for purpose of demonstration of the air sparging technology, can be represented by other surfactants, such as detergent. For this purpose, a detergent agent was used to illustrate the effect of air sparging in two tests; one with a small cup and one within an artificial aquifer, composed of a gravel-filled glass tank and gravel. The experiment was separated into three phases in order to collect quantitative results and create a video to visualize the method.

FIG. 3 shows a small-scale test first performed by bubbling air through tube 56 into clear plastic cup 57 containing gravel layer 30, water 44, and the surfactant 32 distributed at the bottom of the cup. This experiment illustrates the efficacy of the technology for concentrating a surfactant contaminant such as PFAS, on the surface of a water body. In this case a surfactant detergent that was dyed blue and is shown here as cross hatched surfactant 32 is at the bottom of cup 57 in the first panel, and after sparging the blue dye has been transported to the surface in the form of dissolved blue dye and PFAS foam. An air pump, not shown, supplied air to tube 56 with the pump running for 10 seconds, sending air bubbles through the gravel and then off for 3 seconds repeatedly for three hours. Surfactant 32 was dyed to help visualize the removal and is shown here in mottled cross hatching. After introduction of air through tube 56 at time 76, 2 minutes 20 seconds, bubbles 64 begin to form and surfactant 32 decreases as shown at 7 minutes time 78 as layer 34. At time 80, elapsed time of 1 hour 21 minutes, more bubbles 66 are formed and surfactant 36 is reduced to layer 38 at time 82, elapsed time of 2 hours 40 minutes, then more bubbles form and more surfactant 68 has risen to the top level. This process continued to time 84 at 3 hours 00 minutes with almost all of the surfactant 52 and bubbles 70 at the top, with gravel layer 40 substantially cleared of surfactant 38. At the conclusion of the test at time 86, 3 hours and 10 minutes, accumulation of the surfactant 54 in the top layer and dissipation of bubbles 74 demonstrates that air sparging dissipated the contaminant in the base of the cup and carried it to the top leaving gravel layer 42 free of surfactant. This small-scale trial confirms the experimental hypothesis and supports the advancement to the true-scale experiment.

As shown in FIG. 3, after only 3 hours of sparging in the cup, the lower level surfactant was transported to the top of the cup above the gravel and a foam head was created. This mimics the proposed removal mechanism in groundwater contaminated with PFAS, where sparging moves the contaminant from within the aquifer and concentrates it near the top of the groundwater unit in the form of higher-concentration groundwater and buoyant material.

Figure 4A:
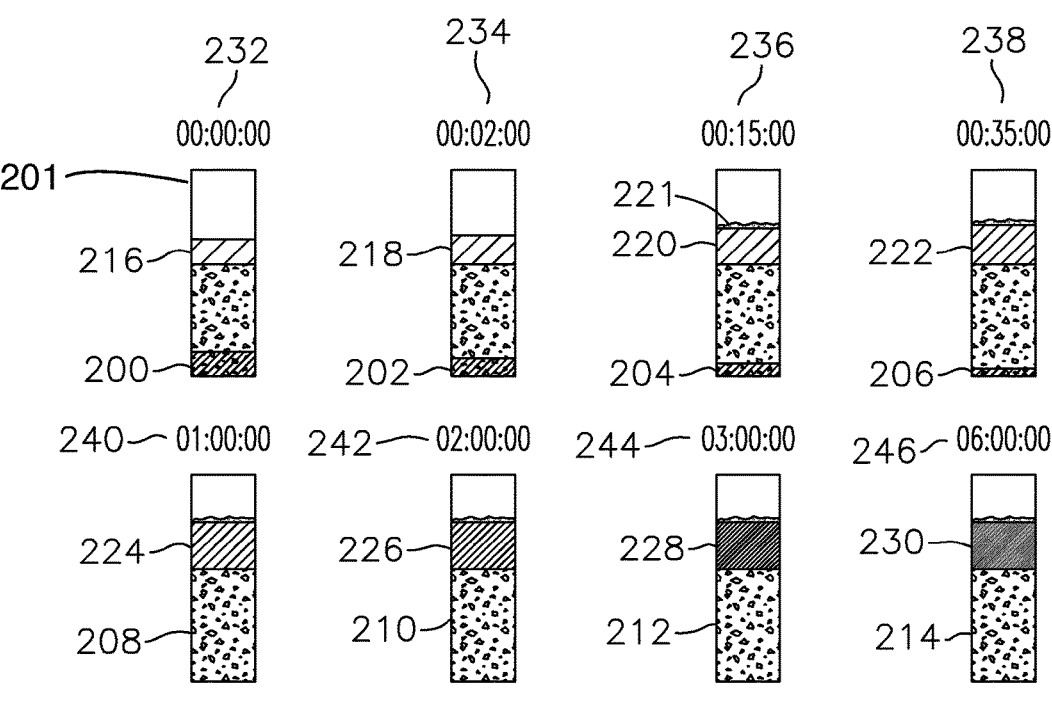
FIGS. 4A and 4B are a demonstration graphic and a graph of a large-scale sparging experiment showing the principles according to a preferred embodiment of the invention.
Figure 4B:
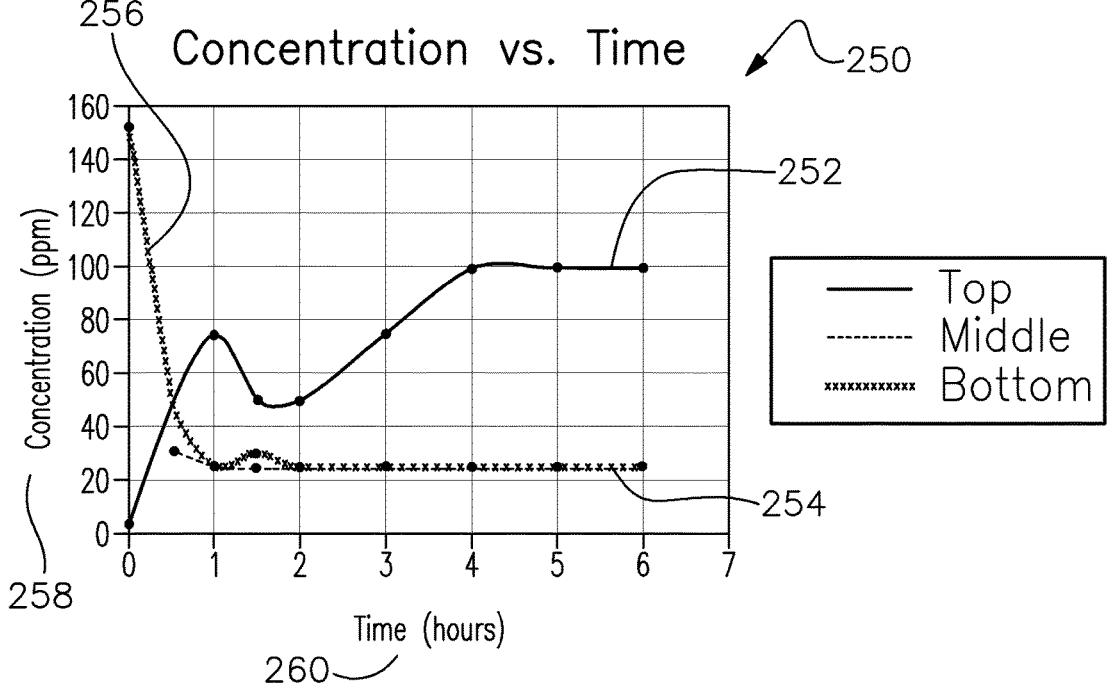

FIGS. 4A and 4B depict a larger scale visual test, the detergent 200 was dyed and the sparging process and dye movement was captured on film. As with FIG. 3, an air pump (not shown) supplies air into cylindrical vessel 201 via a tube (not shown) that extends to the bottom of vessel 201. In the quantitative phase, a test kit was used to measure the concentration of detergent at different points in the aquarium throughout the experiment while air sparging was used). FIG. 4B shows graph 250 of the concentration of surfactant in the three layers shown in FIG. 4A. At the beginning of the experiment the concentration at the top of the tank was near zero (line 252) (3 parts per million or ppm) and 150 ppm at the bottom of the tank (line 256). This corresponds to FIG. 4A at time 232, 0:00:00. After time 246, 6 hours of air sparging from a tube located at the bottom of the tank, the top concentration shown in line 252 increased to 100 ppm, and the bottom concentration shown in line 256 was reduced to 25 ppm. In this experiment, the detergent in the bottom of the column at time 232 0:00 is a surrogate for a PFAS plume in groundwater before treatment with the sparging process. The bottom right panel showing in FIG. 4A at time 246 6:00 represents the groundwater aquifer after several months or more of sparging where the PFAS 200 changes from panel to panel, from 216, to 218, 220, 222, 224, 226, 228 and finally to 230 as it has been forced to the top of the groundwater unit by sparging where it is present as groundwater with higher concentration of PFAS and PFAS buoyant material.

As shown in FIG. 4A, layer 200 at the bottom of tube 201 disperses over time. At time 232, 0 minutes, top layer 216 is nearly colorless. At time 234, 2 minutes, top layer 218 darkens in color demonstrating that the detergent is traveling upwards through the gravel. This continues as layers 220, 222, 224, 226, 228 and 230 become progressively more concentrated. Similarly, the presence of layer 200 becomes progressively smaller at 202, 204, 206, clearing bottom areas 208, 210, 212 and 214 and is essentially gone at time 246, 6 hours. This is also shown by the formation of foam 221 at time 236, 15 minutes. At time 240, 1 hour, layer 200 that is initially present at the bottom of the vessel has completely dissipated by time 246, 6 hours. From times 242 at 2 hours to time 246 at 6 hours, the change at the top level is minimal, suggesting that the detergent transfer has reached completion. FIG. 4A shows that air sparging successfully operated by transporting the detergent from the bottom to the top layer.

FIG. 4B shows quantitative data in graph 250 of concentration 258 graphed over time 260. Top layer 252, bottom layer 254 and middle layer 256 are shown over a 6-hour period. The concentration at bottom layer 254 of the vessel was reduced from 150 ppm to 25 ppm in the course of only 2 hours, which is equivalent to an 83% reduction in concentration. Furthermore, the concentration of top layer 252 increased from 3 ppm to 100 ppm in 4 hours which is an increase of 3,233%. Middle layer 256 started at a much lower concentration than bottom layer 254, 30 ppm, and declined to 25 ppm, a 16% decrease. This removal was only after 6 hours of sparging. Because actual sparging systems are designed to run for months or years, better performance is expected over time.

The smaller percent reduction experienced by middle layer 256 has a few possible causes. First, as the detergent dispersed from the bottom, it had to travel through middle layer 256 of gravel before it could accumulate in the water above. This means that while the detergent originally in middle layer 256 of the gravel may have dispersed, it was also being replaced by detergent from the bottom layer 252. Furthermore, both middle 256 and bottom layer 254 concentration profiles exhibit asymptotic behavior at 25 ppm. This may indicate that air sparging is more effective on high concentration solutions and is less effective at removing PFAS below levels of 25 ppm. Lastly, the asymptotic behavior of bottom, middle, and top concentration profiles past 4 hours of air sparging, may indicate that the technology is most effective in shorter timeframes and that it experiences some diminishing returns past certain times.

In the Embodiments shown in FIGS. 5, 6, 7, and 8, typical groundwater gas sparging wells are constructed and operated with the screen of the sparge well at the bottom of the PFAS plume in groundwater. However rather than performing sparging to volatilize the contaminants or to introduce oxygen for aerobic biodegradation of the contaminants, this embodiment is designed to separate PFAS from groundwater and transport it to the top of the aquifer for subsequent removal, in-situ treatment or long-term sequestration.

In one embodiment shown in FIG. 5, shallow groundwater collection trench 281 intercepts just the top layer 283 of aquifer 17 with groundwater flow direction 276 and with PFAS plume 274 and is constructed to remove the shallow, high PFAS concentration groundwater layer that has been concentrated by the sparging (FIG. 5).

Sparging air, nitrogen, or other gas is pulsed into casing 270 and out screen 275. Pulsing is used to change air channels 272, transfer PFAS from the PFAS plume 274 to the channels and force PFAS upward toward top of aquifer 17. A lower volume pump near the bottom of the trench 280 captures high concentration PFAS sending a concentrated PFAS water stream to the top for treatment in a water treatment unit 282. Collection of PFAS and treatment of buoyant material 284 can be accomplished with existing technologies.

In an alternative sequestration approach, sequestration materials 278 are to be added near the water table in the trench to sequester rather than extract PFAS. These sequestration materials 278 could include activated carbon, ion exchange resins, zeolites, or other geologic material to promote sequestration versus air/water interfaces or diffusion. Trench 281 may be shallow and penetrates the top layer 283 of aquifer 17 at trench bottom 280.

Alternatively, in another Embodiment shown in FIG. 6, a series of shallow extraction wells 297 are installed near the top of aquifer 286 having groundwater flow direction 293 to skim off the high concentration groundwater for subsequent treatment. Sparging gas is introduced into casing 270 and out screen 275 to treat the PFAS plume 295. Air channels 272 are formed and PFAS is transported upward and laterally by groundwater flow 293 into extraction well 297 through screen 291. The PFAS containing water phase is treated in a surface water treatment unit 290 and the extracted buoyant material is treated in a treatment unit 292. In an alternative sequestration approach, sequestration agents 294 could also be added to help concentrate PFAS in the shallow groundwater.

In both cases shown in FIG. 5 or 6, groundwater treatment of the low volume, high concentration extracted groundwater stream will be more cost effective than the removal of all the groundwater flowing through the contaminated part of the groundwater and subsequent surface treatment of the stream containing low concentrations of PFAS. The surface treatment of the extracted groundwater stream from the trench or groundwater wells will be by using existing technologies for treatment of PFAS streams from groundwater pump and treat systems such as adsorption with Granular Activated Carbon (GAC).

In FIGS. 5 and 6, buoyant material that may be generated by gas sparging within the aquifer and moved to the top of the aquifer can also be extracted if needed or desired. The buoyant material is generated because PFAS compounds are surfactants and attached to air/water interfaces. The buoyant material could then be removed via suction using a variation of a commonly used remediation technology for the unsaturated zone such as soil vapor extraction. Once at the surface the buoyant material in the form of a foam could be separated and broken using existing technologies (e.g., WO2017/210752, Phillips et al., 2017), and then the resulting high concentration groundwater stream treated using conventional methods.

Alternatively, in the embodiments shown in FIGS. 5 and 6, materials can be added to the top of aquifer or trench near water table (e.g., activated carbon, ion exchange resins, zeolites, geologic material, or gas) to promote sequestration via sorption, partitioning, or diffusion) so the PFAS will not migrate and impact receptors. These are shown as 278 in FIGS. 5 and 294 in FIG. 6.

Figure 7:
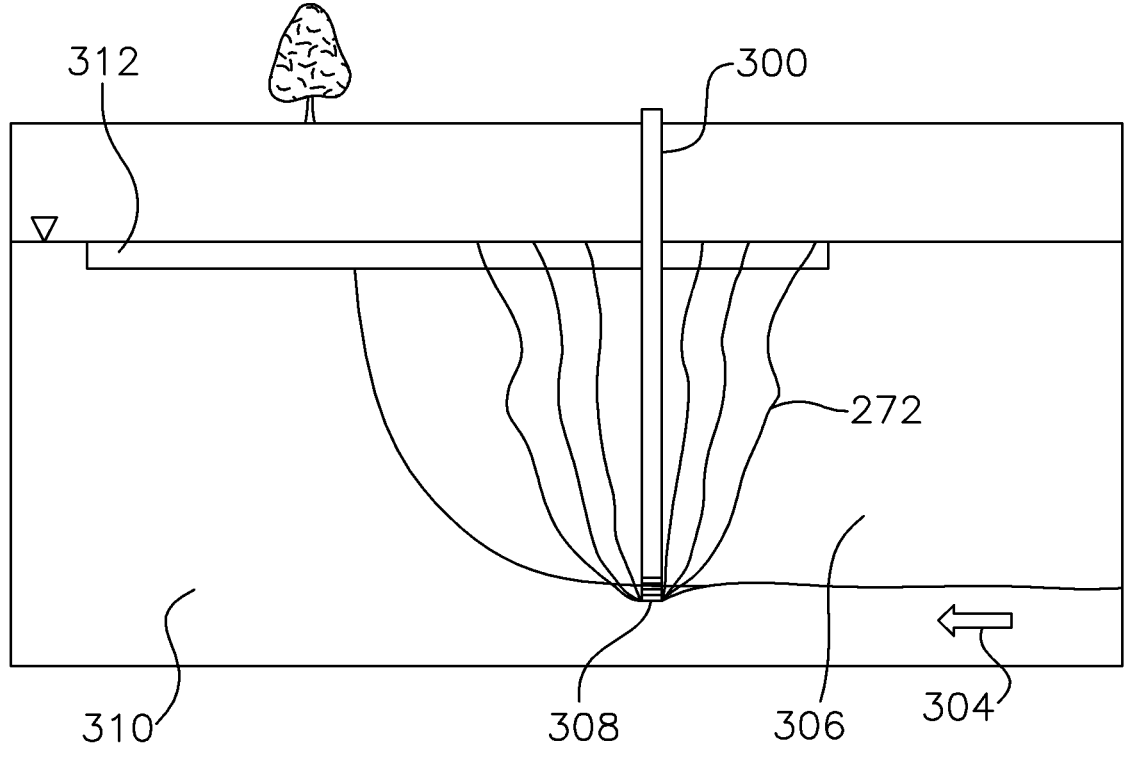
FIG. 7 illustrates a PFAS Plume according to a preferred embodiment of the invention being managed via long-term sequestration of PFAS according to a preferred embodiment of the invention.

In FIG. 7 showing yet another embodiment, the sparging is performed to move the PFAS plume 306 from a highly mobile compartment (shown by groundwater flow direction 304) and sequester the PFAS for long time scales (potentially decades or more) in a low mobility compartment 312, in this case as a buoyant material around the water table or within the aquifer. The mixture of gas and water greatly reduces the groundwater flow rate in this area. Buoyant material is conveyed through channels 272 are formed by introducing gas down casing 300 and out screen 308 to migrate PFAS upward to top of aquifer 310. In this embodiment, PFAS plumes are much thinner and therefore will reduce the mass discharge to receptors such as drinking water, wells or surface water at top 312. Sequestration agents can also be added to increase the degree of the sequestration, or augmented through use of in-situ sorptive agents such as carbon, or zeolites and other materials.

The long-term sequestration concept is illustrated in a Compartment Model developed by Brusseau et al. (Brusseau, M. L., Ni Yan, S. Van Glubt, Y. Wang, W. Chen, Y. Lyu, B. Dungan, K. C. Carroll, F. O. Holguin, 2019. Comprehensive retention model for PFAS transport in subsurface systems, Water Research, Volume 148, 2019, 41-50, ISSN 0043-1354, https://doi.org/10.1016/j.watres.2018.10.035) where the retardation factor for PFAS through an unsaturated sand was 7, compared to a retardation factor of 1.8 for completely saturated conditions. A related calculation showed that the interfacial process accounted for approximately 50% of the total retention in a model system that had 20% air saturation (Brusseau, M. L., Assessing the potential contributions of additional retention processes to PFAS retardation in the subsurface, Science of The Total Environment, Volumes 613-614, 2018, Pages 176-185, ISSN 0048-9697, https://doi.org/10.1016/j.scitotenv.2017.09.065). Simply put, instead of having PFAS migrate in groundwater through gravels and sands where it might contaminate drinking water wells or surface water, the sequestration embodiment retains the PFAS in the subsurface either permanently or in a form where the PFAS release is extremely small and therefore does not cause a problem.

Figure 8:
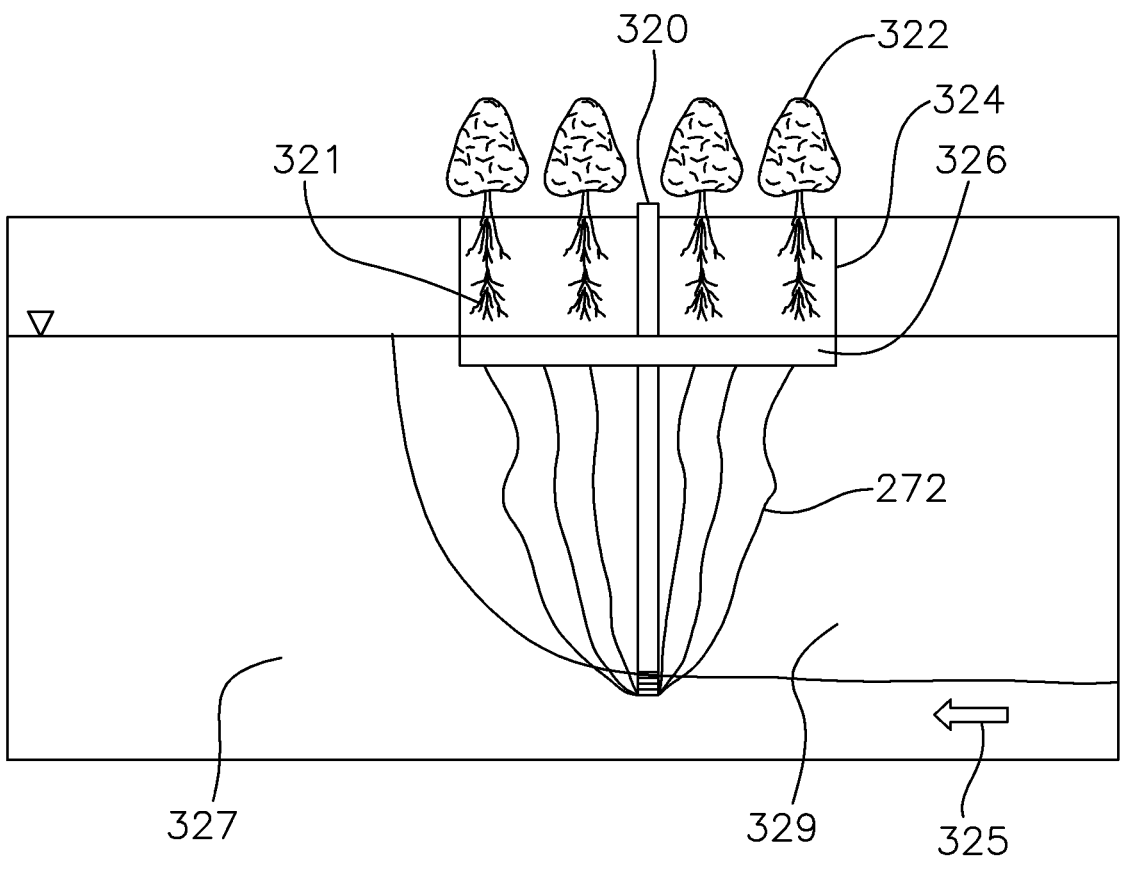
FIG. 8 illustrates a PFAS Plume according to a preferred embodiment of the invention being treated using phytoremediation according to a preferred embodiment of the invention.
Figure 9:
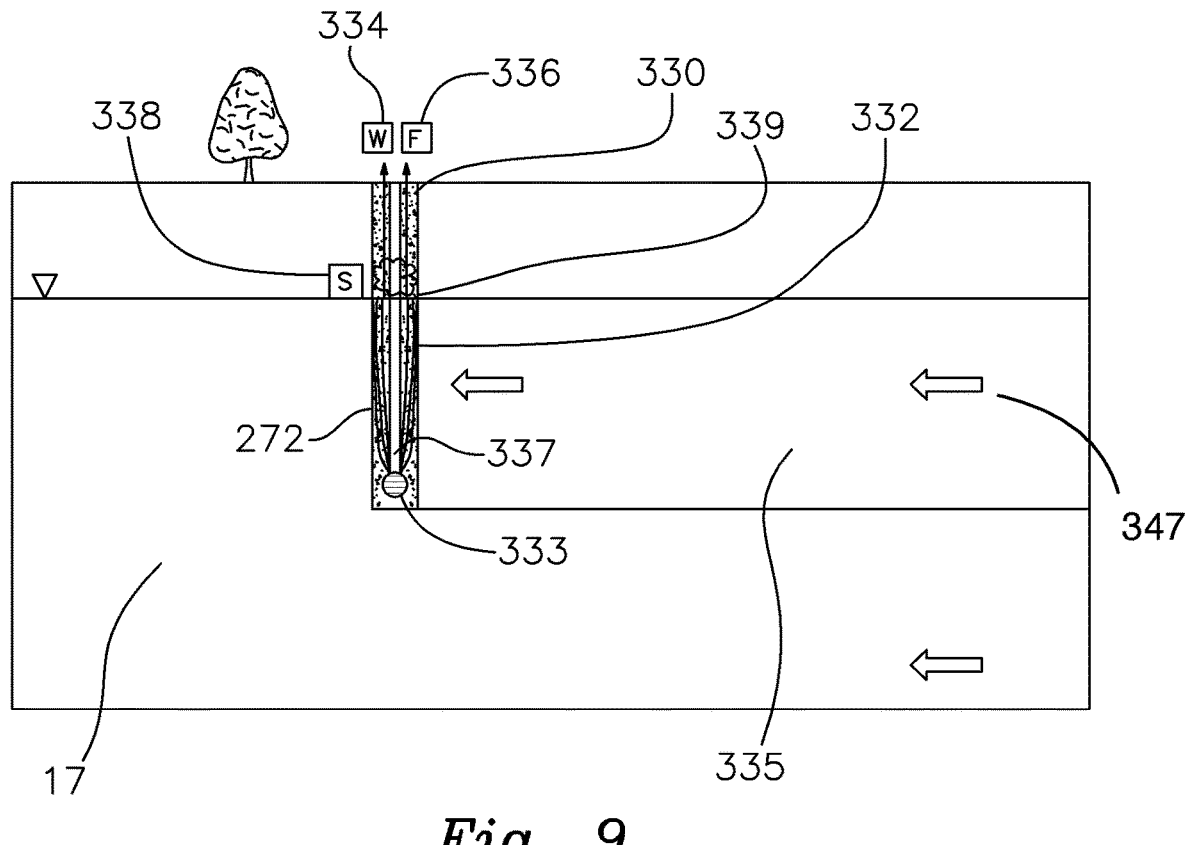
FIG. 9 illustrates a PFAS Plume according to a preferred embodiment of the invention being treated by sparging within an emplaced porous media within a trench and collection of the concentrated PFAS at the water table with wells according to a preferred embodiment of the invention. Alternatively, sequestration agents such as activated carbon, ion exchange resins, or zeolites and other materials could be emplaced near the water table instead of extracting the contaminated buoyant material and groundwater. In a third application, the concentration step reduces the volume of aquifer that needs to be treated using in-situ remediation technologies.

In FIG. 8, another embodiment shows the gas sparging in the aquifer that concentrates the dissolved PFAS plume 329 and any PFAS containing buoyant material in the top of the aquifer having flow direction 325, so that phytoremediation, a remediation technology where plants extract contaminants from the subsurface, could be employed to remove the PFAS by uptake through the roots. Gas is introduced through casing 320 and out a screen as previously described to form channels 272 thereby moving the sparged gas to top 326 of aquifer 327 where trees 322 are positioned having extended roots 321 into root zone 324. This method of extraction has been discussed in "Plant uptake of per- and polyfluoroalkyl substances at a contaminated fire training facility to evaluate the phytoremediation potential of various plant species," Environmental Science & Technology, 51(21), 12602-12610. https://doi.org/10.1021/acs.est.7b02926. Gobelius, Lewis, & Ahrens, 2017 who evaluated the removal of PFAS by a variety of tree species and determined that up to 1.4 grams of PFAS per hectare per year could be removed from the subsurface under the experimental methods they tested. Based on these data and other studies, Ross et al., (2018) concluded that the use of phytoremediation to intercept PFAS plumes may be feasible. But with the sparging process herein described, the PFAS is concentrated and moved much closer to the root zone of any plants/trees and therefore would greatly enhance any phytoremediation process.

Figure 10:
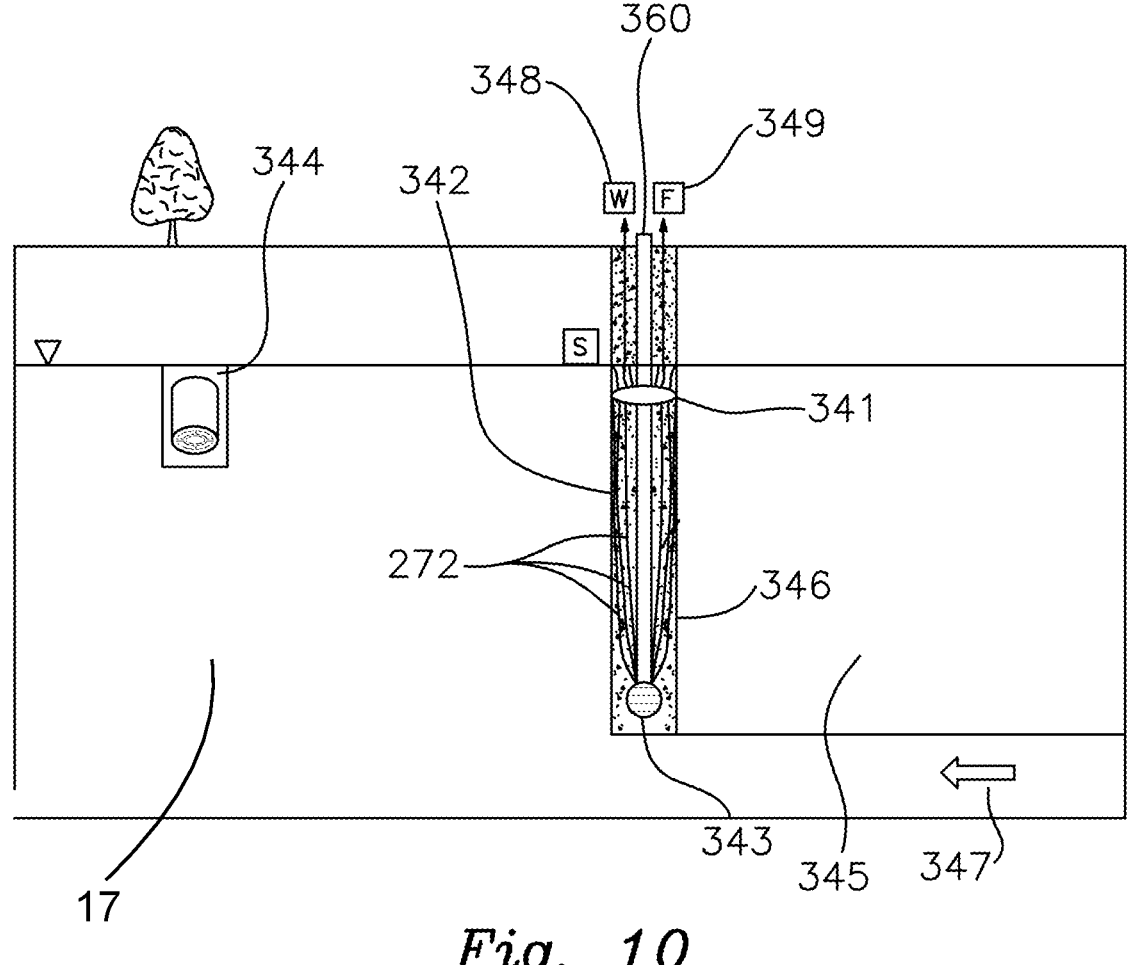
FIG. 10 illustrates a PFAS Plume according to a preferred embodiment of the invention being treated using an emplaced porous media within a trench and collection at the water table with a seal and check valve to allow for selective passage of water and buoyant material according to a preferred embodiment of the invention.

In FIGS. 9 and 10, alternative Embodiments are shown where a permeable trench is constructed to intercept the PFAS plume 335 flowing in the aquifer 17 in direction 347 and gas sparging is performed within the trench. FIG. 9 shows a trench 332, relatively deep, emplaced in aquifer 17 with a horizontal well 333 with well screen positioned from ground surface into aquifer 335 within trench 332. Vertical pipes 337 spaced along the length of the trench provide gas for the horizontal sparge wells. Trench 332 is filled with a porous media 330 such as gravel to entrain the PFAS contaminated groundwater in the sparge zone in the trench. Gas is introduced into a horizontal well 333 and upward through trench 332 with air channels 272 formed within trench 332. Sparged gas moves from horizontal well 333 inside trench 332 to water table 339 in trench 332. Low volume water with high concentration of PFAS is treated at the surface with a water treatment unit 334. Any foam phase is treated in a foam treatment unit 336. Alternatively, sequestration phase 338 may be employed as previously described instead of extraction and treatment.

Under its natural horizontal flow gradient, groundwater 335 will flow through one side of trench 332 and back out the opposite side. The sparging in the trench serves to concentrate PFAS at the surface of the water, thereby facilitating the removal or treatment of the now-concentrated, lower-volume of contaminated groundwater or buoyant material. As with the embodiments shown in previous figures, the sparging would concentrate PFAS in the upper portion of the trench and remove PFAS from the deeper part of the trench. PFAS removal from the top portion of the trench could be by skimming high concentration groundwater or by removing the PFAS buoyant material that is generated. Even in the absence of removal, the sparging can also concentrate and displace the PFAS away from groundwater flow or extraction zones, thereby serving to sequester the PFAS in unused or less-used portions of the aquifer. This sequestering in the trench could be enhanced by the addition of materials such as activated carbon, ion exchange resins, zeolites, geologic material, or gas. The extracted groundwater and/or buoyant material could then be treated using existing ex-situ treatment technologies.

FIG. 10 is a modification of the embodiment in FIG. 5 where a seal 341 (such as an impermeable plastic layer) perforated with check valves 344 (shown in callout as example valve but not intended to depict its location) near the water table in trench 346 that allow gas or water that is mobilized during the sparging process to pass up above seal 341 for treatment/removal but prevents this mobilized gas, water, and buoyant material from flowing back down, therefore helping concentrate the PFAS above the seal. FIG. 10 shows a trench 346, emplaced in aquifer 345 with a horizontal well with well screen 343 positioned from ground surface into aquifer 345 within trench 342. Vertical pipes 360 spaced along the length of the trench provide gas for the horizontal sparge wells. Trench 342 is filled with a porous media 346 such as gravel to entrain the PFAS contaminated groundwater in the sparge zone in the trench. Gas is introduced into a horizontal well through screen 343 and upward through trench 342 with air channels or bubbles 272 formed within trench 342. Sparged gas moves inside trench 342 to the water table. A sequestration phase "S" may be employed as well. Water treatment unit 348 and a foam treatment unit 349 may also be used.

FIG. 11 illustrates a PFAS Plume 403 being treated with a wellpoint system that "slurps" up a mixture of buoyant material. Pumping and treatment 409 of the low volume, high PFAS concentration water stream and buoyant material for separation/treatment using existing technologies is depicted. FIG. 11 shows channels 272 of sparged gas extending from sparge well screen 407 to top 400 of the aquifer 17. Sparging of air, nitrogen or other gas is introduced into casing 402 and out screen 407 and by using pulsed sparging change air channels 272 and force PFAS upwards. PFAS is collected through wellpoint 401 that collects PFAS at top layer 400 of plume 403 through wellpoint screen 404.

While the invention has been described in connection with preferred embodiments, it is not intended to limit the scope of the invention to the particular form set forth, but on the contrary, it is intended to cover such alternatives, modifications, and equivalents as may be included within the spirit and scope of the invention as defined by the issued claims.

The invention claimed is:

1. A method for the decontamination of a subsurface aquifer containing one or more PFAS contaminants, comprising the steps of:

a) injecting gas under pressure directly into an aquifer comprising a porous natural material to form continuous air channels filled with buoyant material in the porous aquifer, the one or more PFAS contaminants accumulating in the buoyant material;

b) forcing the buoyant material to rise to a water table or the top of the aquifer where some of the PFAS will desorb from the buoyant material, concentrating the PFAS in a shallow groundwater; and c) extracting the shallow groundwater near the water table of the aquifer or top of the aquifer that contains the concentrated PFAS.

2. The method as claimed in claim 1 further comprising the step of collecting the buoyant material for treatment.

3. The method as claimed in claim 1 wherein the porous natural material is comprised of one or more of the following: gravel, sand, silt, clay, or fractured geologic media, or some combination thereof.

4. The method as claimed in claim 1 further comprising the step of extraction through phytoremediation.

5. The method as claimed in claim 1 further comprising the step of extraction using groundwater extraction wells.

6. The method as claimed in claim 1 further comprising the step of extraction from the shallow groundwater through a groundwater extraction trench.

7. The method as claimed in claim 6 further comprising a seal and/or check valve in a screened well or open tube near the water table in the groundwater extraction trench to selectively permit buoyant material and water to flow upward.

8. A method for the decontamination of a subsurface aquifer containing one or more PFAS contaminants, comprising the steps of:

a) injecting pressurized gas directly into an aquifer through a natural aquifer material to form a buoyant material in the aquifer comprising a porous material, the one or more PFAS contaminants accumulating on the buoyant material via air/water partitioning without-volatilization by sparging;

b) forcing the buoyant material to be transported upward in continuous channels to a water table in the aquifer or the top of an aquifer where some of the PFAS will desorb, concentrating the PFAS in groundwater; and c) extracting the groundwater near the water table in the aquifer or top of the confined aquifer that contains the concentrated PFAS.

9. The method as claimed in claim 8 further comprising the step of collecting the buoyant material for treatment with the creation of bubbles moving upward in the channels.

10. The method as claimed in claim 8 further comprising the step of extracting buoyant material with a vacuum above the water table.

11. The method as claimed in claim 10 further comprising the step of breaking the buoyant material.

12. The method as claimed in claim 8 further comprising the step of extraction of buoyant material with phytoremediation.

13. A method for the decontamination of a subsurface aquifer containing one or more PFAS contaminants, comprising the steps of:

a. Injecting gas through a screened well or open tube into an emplaced porous material in the aquifer so as to form a buoyant material in the trench, the one or more PFAS contaminants accumulating on the buoyant material; and b. allowing the buoyant material to rise to the top of the emplaced porous material where some of the PFAS will desorb from the buoyant material, thereby concentrating the PFAS in the shallow groundwater in the emplaced porous material.

14. The method as claimed in claim 8 further comprising the step of collecting the buoyant material for treatment.

15. The method as claimed in claim 8 further comprising the step of adding materials to sequester PFAS near the water table.

16. The method as claimed in claim 15 wherein the materials are selected from a group comprising activated carbon, ion exchange resins, zeolites, geologic materials, and gases.

17. The method as claimed in claim 8 further comprising the step of extracting groundwater near the water table.

18. The method as claimed in claim 13 further comprising the step of extracting buoyant material on the water table.

19. The method as claimed in claim 17 further comprising the step of phytoremediation.

20. The method as claimed in claim 8 further comprising the step of using a groundwater extraction well.

21. The method as claimed in claim 8 further comprising the step of using a groundwater extraction trench.

22. The method as claimed in claim 8 further comprising the step of using a wellpoint system.

23. The method as claimed in claim 21 further comprising a seal and check valve to selectively permit flow of water and gas.

24. A method for the decontamination of a subsurface aquifer containing one or more PFAS contaminants, comprising the steps of:

a. injecting gas under pressure into the aquifer through a natural aquifer material so as to form a buoyant material in the aquifer, the one or more PFAS contaminants accumulating on the buoyant material;

b. forcing the buoyant material to rise to the water table or the top of a confined aquifer where some of the PFAS will desorb from the buoyant material, concentrating the PFAS in the shallow groundwater; and c. whereby the PFAS remains sequestered in the mix of air and groundwater near the top of the water table or top of the confined aquifer.

25. The method as claimed in claim 24 further comprising the step of removing the sequestered PFAS from the top of the water table.

26. A method for the decontamination of a subsurface aquifer containing one or more PFAS contaminants, comprising the steps of:

a. injecting gas into the aquifer through a natural aquifer material so as to form a buoyant material in the aquifer, the one or more PFAS contaminants accumulating on the buoyant material;

b. allowing the buoyant material to rise to the water table or the top of a confined aquifer where some of the PFAS will desorb from the buoyant material, concentrating the PFAS in the shallow groundwater; and c. thereby reducing the treatment volume required for in-situ remediation.

\* \* \* \* \*